United States Patent

Yate

[15] 3,639,106
[45] Feb. 1, 1972

[54] ACOUSTIC PANEL

[72] Inventor: Reginald W. Yate, Watford, England

[73] Assignee: Burnley Engineering Products Limited, Burnley, Lancashire, England

[22] Filed: Apr. 14, 1969

[21] Appl. No.: 815,661

[30] Foreign Application Priority Data

May 6, 1968   Great Britain.......................21,441/68
May 16, 1968  Great Britain.......................23,207/68
May 16, 1968  Great Britain.......................23,208/68
July 17, 1968  Great Britain.......................34,136/68

[52] U.S. Cl..................................29/191, 29/471.7, 52/451, 161/68, 181/33 G
[51] Int. Cl..........................................B21d 39/00
[58] Field of Search...............29/455 LM, 471.1, 471.7, 191; 52/451, 443; 161/68; 181/33 G

[56] References Cited

UNITED STATES PATENTS

| | | | |
|---|---|---|---|
| 3,368,314 | 2/1968 | Maynard................................29/455 |
| 3,030,703 | 4/1962 | Wirsing..................................29/455 |
| 2,851,133 | 9/1958 | Steele....................................29/455 |
| 1,576,559 | 3/1926 | Swift.....................................181/336 |
| 3,040,444 | 6/1962 | Koch.....................................161/68 |
| 3,071,216 | 1/1963 | Jones et al..............................29/191 |
| 3,401,025 | 9/1968 | Whitney................................29/191 |

Primary Examiner—John F. Campbell
Assistant Examiner—Richard Bernard Lazarus
Attorney—Young & Thompson

[57] ABSTRACT

A method of joining together in sandwich manner a unit comprising a first metallic sheet and a second metallic sheet with a cellular metallic core between them is effected by welding the first sheet to suitable prominences on the cell walls of the core and brazing the second sheet to the core in such a way that brazing material enters and so reinforces the corners of the cells but is not permitted to flow on to the first sheet. The unit constitutes an acoustic panel in which the first sheet is an acoustic sheet which is welded to the prominences on the cell walls of the core while the second sheet is brazed to the core with brazing material having been caused to flow into corners of the core cells to reinforce said corners and effectively secure the second sheet to the core, but without the braze material having been permitted to flow on to said acoustic sheet.

5 Claims, 7 Drawing Figures

PATENTED FEB 1 1972

Inventor
REGINALD W. YATE
By Young & Thompson
Attorneys

Inventor
REGINALD W. YATE

ACOUSTIC PANEL

BACKGROUND OF THE INVENTION

This invention relates to a method of joining together in sandwich manner metallic sheets or the like to form units in the form of panels or lightweight tubular elements, and to the product thereof. While the invention is concerned particularly with a method of producing an acoustic panel for incorporation in an aircraft gas turbine engine for the purpose of silencing or noise abatement, it is also applicable to a sealing unit for such an engine or to a lightweight tubular element, preferably heat resistant, primarily for use in association with the hot end equipment for exhaust gases of such an engine. For simplicity, the invention will be described as applied to the production of a panel.

The panel to be produced consists in its simplest form of a first metallic sheet having acoustic properties, in the case of an acoustic panel, or sealing and rubbing properties, in the case of a sealing unit, a cellular metallic core applied to one face of said sheet with the axes of the cells normal or inclined to said sheet, and a second metallic sheet applied to the face of the core remote from said first sheet.

It is known in the prior art to form such a panel by forming the ends of the cells of the core with attachment elements and to braze or weld these elements to one of the sheets, and to braze the other sheet to the ends of the cells remote from the attachment elements. It is also known to cause braze material to flow into the corners of the cells of the core of such a panel. However it is extremely important with the panel of the invention having regard to the purposes for which it is applicable, that any braze material which flows into the corners of the cells of the core should not deleteriously affect the first sheet of the panel.

SUMMARY OF THE INVENTION

We have found that such panels can be provided with desirable mechanical properties without significantly affecting the first sheet's properties by welding the first sheet to suitable prominences on the cell walls of the core and brazing the second sheet to the core in such a way that brazing material enters and so reinforces the corners of the cells but is not permitted to flow on to the first sheet.

According to the invention, the method includes the steps of forming the ends of the sidewalls of the cells to be applied to said first sheet with attachment elements, applying braze material to the ends of the sidewalls of the cell remote from said attachment elements, applying and welding said first sheet to said attachment elements of the core while said second sheet is brazed to the end of said core remote from said attachment elements, the braze material having been caused to flow into corners of said cells so as to reinforce said corners and effectively to secure said second sheet to said core, but has not been permitted to flow on to said first sheet.

According to a further aspect of the invention an acoustic panel comprises an acoustic sheet and a second metallic sheet with a cellular metallic core between them, the axes of the cells being normal or inclined to each sheet, in which the acoustic sheet is welded to elements formed upon the ends of the sidewalls of the cells of the core while the second sheet is brazed to the core, and wherein brazing material has been caused to flow into corners of the cells of the core so as to reinforce those corners and effectively to secure the second sheet to the core, but has not been permitted to flow on to the acoustic sheet.

Embodiments of the invention as applied to an acoustic panel will be described by way of example only with reference to the accompanying drawings in which.

Figure 1:
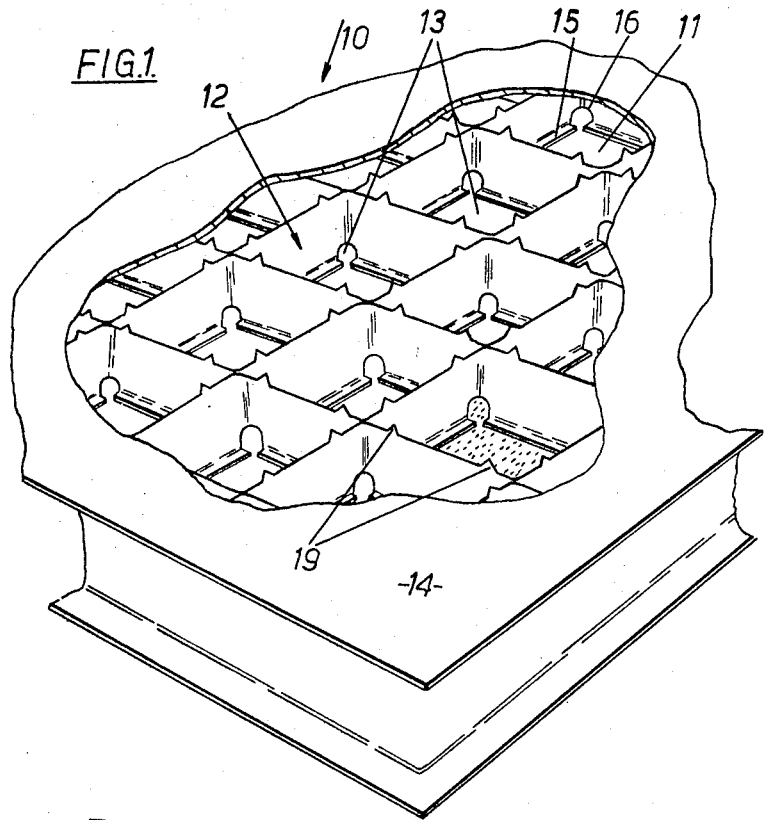
FIG. 1 is an isometric view of part of one embodiment of panel with part of one sheet cut away to show the interior of the panel.

Referring to the drawings in which like numerals denote like parts, the panel 10 consists of an acoustic sheet 11, a metallic core indicated generally by 12 applied to one face of the sheet 11 with the axes of the cells 13 normal to the sheet 11, and a second metallic sheet 14 applied to the face of the core 12 remote from the sheet 11. It will be understood that, if desired, the axes of the cells 13 may be inclined to the sheet 11 without departing from the scope of the invention. An example of an acoustic sheet for use in the invention is one comprising a metallic mesh, the interspaces of which are filled with metallic fibrous material, so that the sheet is sufficiently porous to accept and trap sound waves in the filled interspaces.

Referring to FIGS. 1 to 6, the cells 13 of the core 12 are formed initially by joining metallic strips together by spot welding to define the cells. The strips may be plain (FIG. 1) or corrugated or fluted at 17 (FIGS. 2 to 7). Before joining together of the strips, each strip is first run through a cropping and forming tool, to corrugate or flute the strip where required (FIGS. 2 to 7), to form on one longitudinal edge of the strip discontinuous flanges or lips 15 interrupted by the bends of the strips and to form cutouts 16 in said bends extending inwardly from said longitudinal edge between the flanges or lips 15.

After the core 12 has been formed, the core is applied to the acoustic sheet 11 with the flanges or lips 15 abutting one face of said sheet. The flanges or lips are then spotwelded to the sheet 11 so that the only blockage of said sheet by the welds is where the flanges or lips are welded thereto and the effect of the welds on the sound-absorbing properties of said sheet is minimal.

Brazing alloy is applied to the junctions of the strips at the corners of the cells 13 remote from the cutouts 16 and a thin dispersion of brazing alloy is also applied to the face of the second metallic sheet 14 to be applied to the core 12, which sheet 14 is then applied to the core 12 in equispaced relationship with the core 12.

Figure 3:
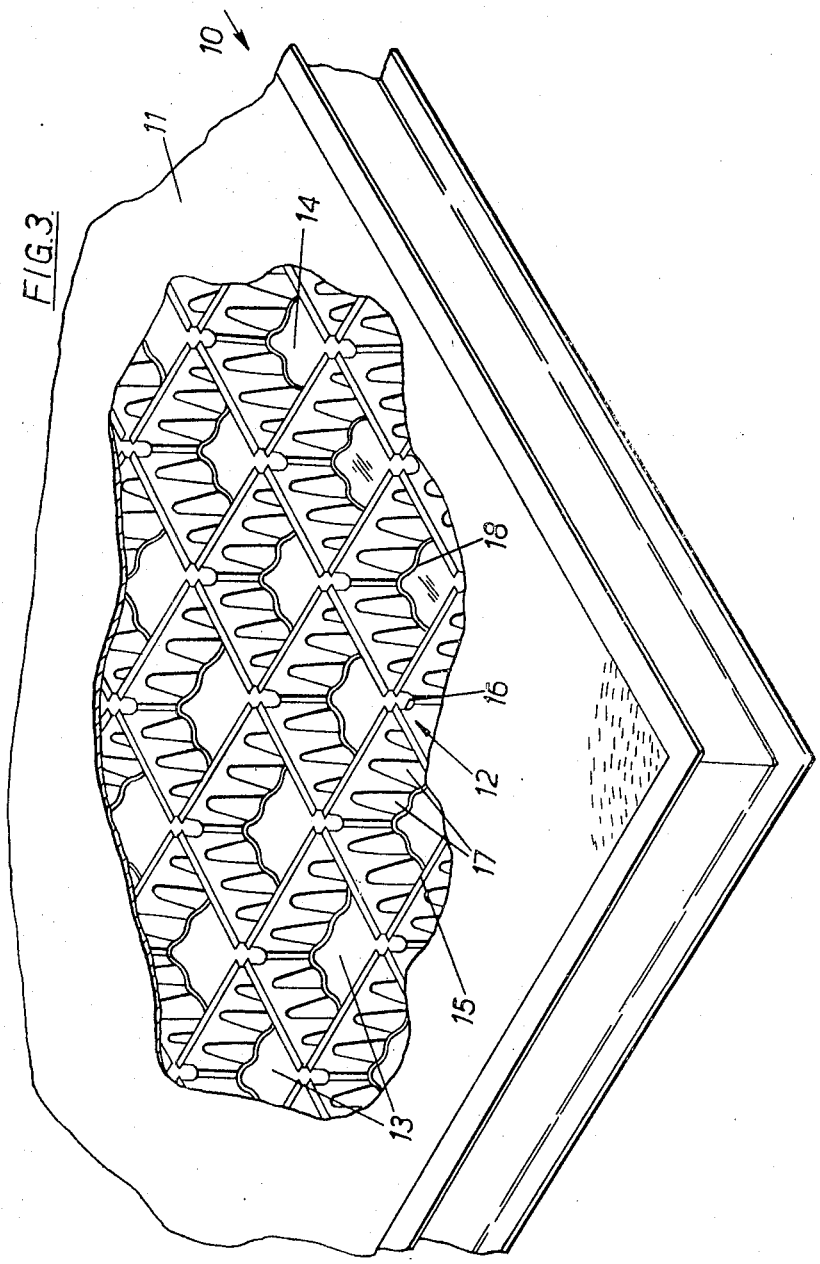
FIG. 3 is an isometric view, to a larger scale than FIG. 1, of the panel of FIG. 1 reversed and with part of the opposed sheet cut away to show the interior of the panel.

The sandwich assembly of panel 10 is then heated in a furnace to braze the sheet 14 to the cellular core 12, and during brazing, the brazing alloy indicated by 18 in FIG. 3 flows by capillary action along the edges of the strips remote from the flanges or lips 15 and along the corners of the cells towards the cutouts 16 not only to strengthen said corners but also to provide a sound joint between said second sheet 14 and the core 12, but is prevented by the cutouts 16 from reaching and contacting the acoustic sheet 11 and thus detracting from the properties of said sheet.

If desired, the ends of the cells contacted by the sheet 14 can also be formed with flanges or lips to effect a more efficient braze between the cells and said sheet.

The flutes or corrugations 17 in the strips provide for bending of the core 12 should it be desired to have a curved panel (as for example in FIG. 4) and when the core is bent, the flutes or corrugations 17 open out or fold inwards, depending on the direction of bending by an amount depending on the distance from the center of curvature. While the cells will deform, the flutes or corrugations prevent damage to the walls or destruction of the cells.

Figure 2:
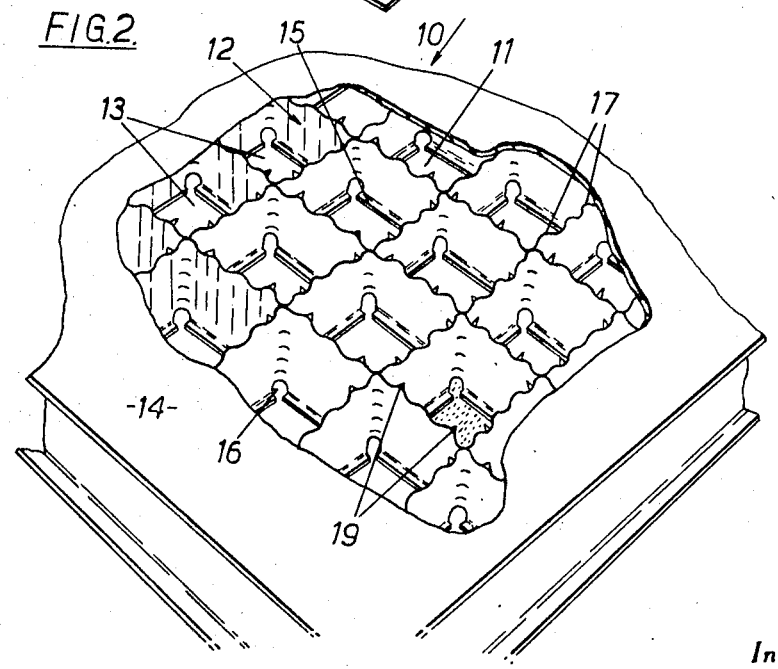
FIG. 2 is a similar view to FIG. 1 but of a modification thereof.

It will be noted from FIGS. 1 and 2 that the longitudinal edges of the strips remote from the flanges or lips 15 are provided with upstanding projections 19 serving as attachment nodes for the sheet 14. When the sheet 14 is brazed to the core 12, the nodes 19 collapse into nuggets and form effective junctions between the core 12 and the sheet 14. The provision of the projections 19 is optional.

Figure 4:
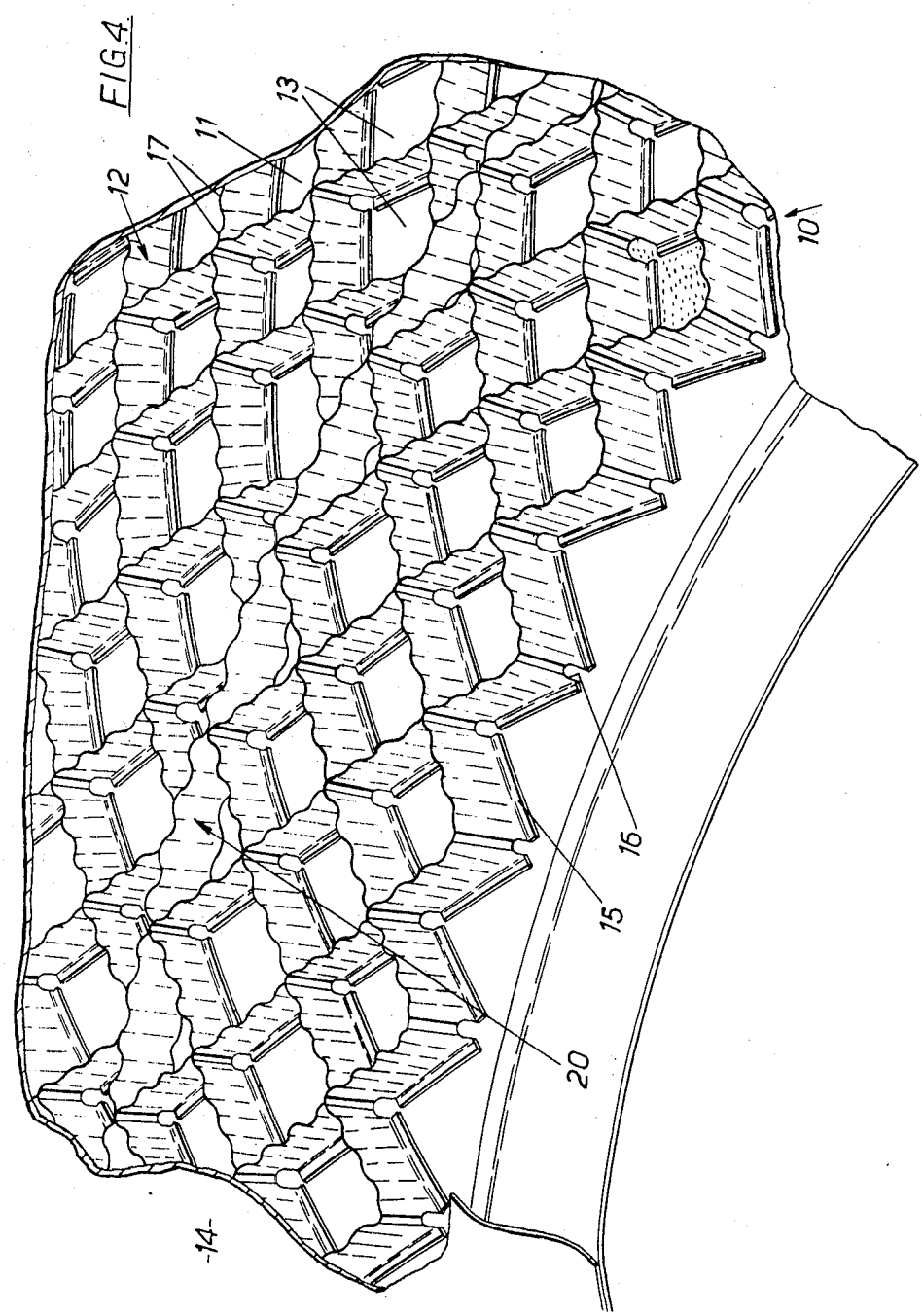
FIG. 4 is an isometric view of part of a second embodiment of panel with part of one sheet cut away to show the interior of the panel.

Referring to FIG. 4, which illustrates a curved panel, it is very important in a curved panel that there should be no path for leakage between the cells, so that while the flutes or corrugations 17 normally provide for bending of the core 12 without damage to the cells, there are occasions when the core has to be sharply distorted, e.g., the core may ultimately have an excessive double curvature, and in this case certain of the cells may become separated and mismatched. In such a case we provide, as illustrated in FIG. 4, a continuous metallic ribbon 20 between mismatching cells. The depth of the ribbon 20 is less than the depth of each cell, so as to ensure that the ribbon does not contact the acoustic sheet 11. The ribbon 20 is spotwelded and brazed to the sheet 14 when the sheet 14 is applied to the core 12. The provision of the ribbon 20 provides a continuous homogeneous structure, so that stress loading of the panel can be continuous about 360° in any direction.

Figure 5:
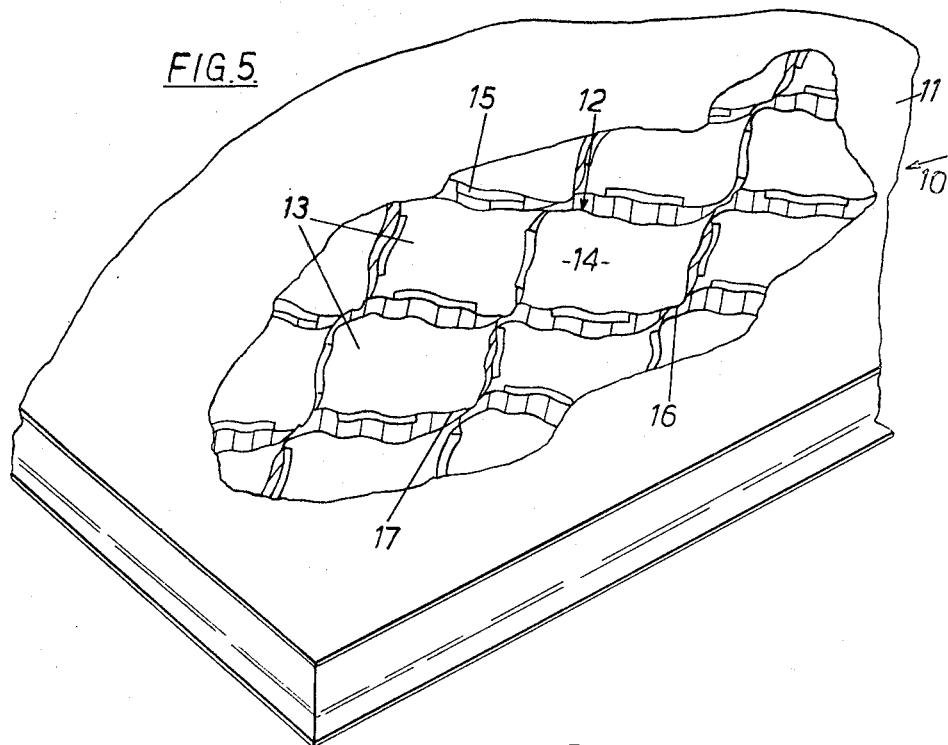
FIGS. 5, 6 and 7 are, respectively, isometric views of part of each of third, fourth and fifth embodiments of panel with part of one sheet cut away to show the interior of the panel.

While the cells of the core illustrated in FIGS. 1 to 4 are of equilateral diamond shape, there is illustrated in FIG. 5 a core structure 12 in which the cells are defined by abutting antiphased sinusoidal strips, the flanges or lips 15 being interrupted where the strips abut to form corners, the cutouts 16 being formed in such corners.

Figure 6:
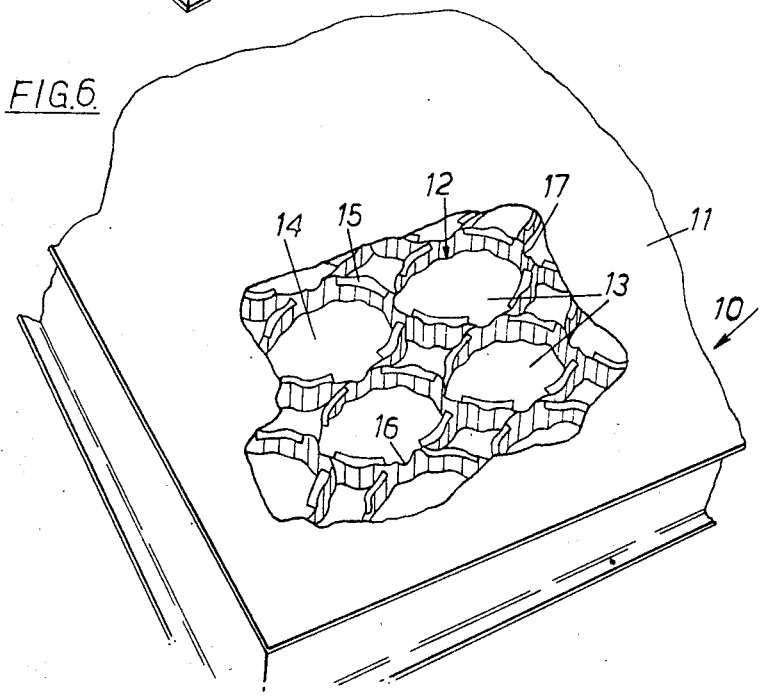

In FIG. 6 there is illustrated a core structure 12 in which the cells are circular, the flanges or lips 15 being interrupted where the strips abut to form corners, and the cutouts 16 being formed in such corners.

Figure 7:
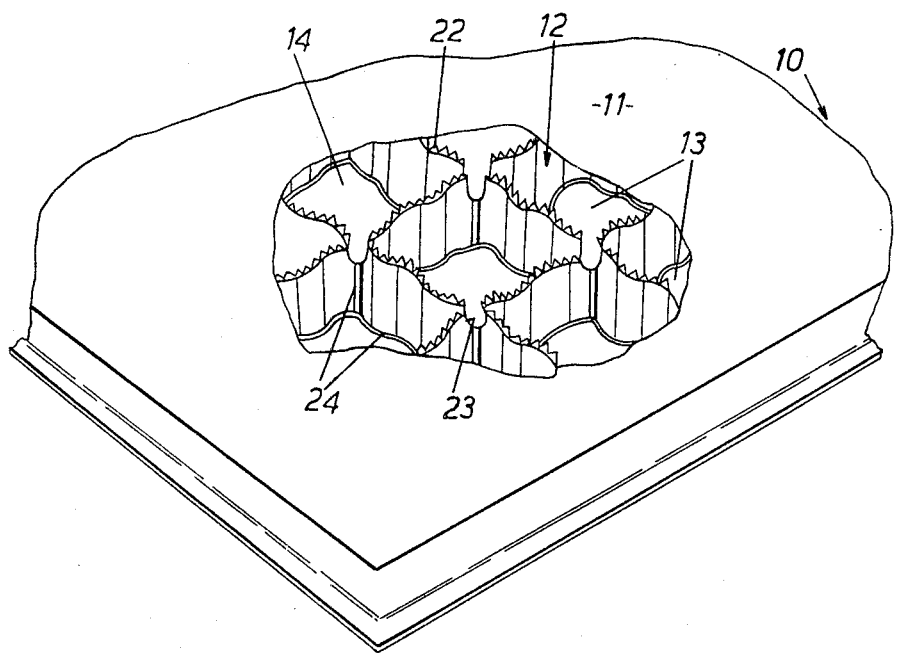

Referring to FIG. 7, the core of the panel differs from the core of the embodiments shown in FIGS. 1 to 6 in that there are provided on one longitudinal edge of each strip projecting teeth formed by a series of serrations 22 in lieu of the flanges or lips. The serrations are formed initially before the strips are joined together by running each strip through a cropping and forming tool to corrugate or flute the strip, to form the serrations 22 on one longitudinal edge of the strip and also cutouts 23 in the bends of the strip and separating the serrations, said cutouts extending inwardly from said longitudinal edge.

After the strips have been joined together and spotwelded to form the cellular core 12, the core is applied to the metallic acoustic sheet 11, with the teeth of the serrations 22 penetrating one face of said sheet. The teeth are then spotwelded, and possibly consolidated with a braze, to the sheet so that the only blockage of said sheet by the welds is where the teeth are welded thereto and the effect of the welds on sound-absorbing properties of said sheet is minimal.

Brazing alloy is applied to the junctions of the strips at the corners of the cells and a thin dispersion of brazing alloy is also applied to the face of the second metallic sheet 14 to be applied to the core 12, which sheet is then applied to the core in equispaced relationship with the sheet.

The sandwich assembly of panel 10 is then heated in a furnace to braze the sheets 11, 14 to the cellular core 12 and, during brazing, the brazing alloy indicated at 24 in FIG. 7 flows by capillary action along the edges of the strips remote from the serrations 22 and along the corners of the cells towards the cutouts 23 not only to strengthen said corners but also to provide a sound joint between said second sheet 14 and the core but is prevented by the cutouts 23 from reaching and contacting the acoustic sheet 11.

If desired, the ends of the cells contacted by the second sheet can be formed with discontinuous flanges or ribs, in the same manner as the embodiments of FIGS. 1 to 6, whereby to effect a more efficient braze between the cells and the sheet.

It will be understood that, in certain circumstances, the flanges or lips 15 (FIGS. 1 to 6) or the serrations 22 (FIG. 7) could be continuous and either the cutouts 16 or 23 made in the cell walls at the corners or the cutouts dispensed with and the corners of the cell walls stopped off by surface treatment to prevent braze material flowing on to the acoustic sheet.

It will also be understood that the configurations of the panel 10 are not restricted to those illustrated and described, but the panel may define a lightweight tubular element preferably heat resistant, for use in association with the hot end equipment for exhaust gases of an aircraft gas turbine engine, or may serve as an exhaust unit, jet pipe, thrust reverser, or nozzle which may be variable or otherwise. The panel may be of any desired cross section, e.g., transition section such as oval or circular. In the case of a circular section the diameter may vary throughout the length of the panel. The sheets may serve as stress skins and be of a material resistant to the high temperature of the exhaust gases. Where the structure is tubular, the depths of the cells of the core may alter progressively circumferentially of the core to avoid deformation of the cells during formation of the core into a tube. In all cases, the cell depth and possibly the cell size may vary depending on the noise attenuation required at any point of the panel and the strength required in said panel.

While the invention has been described in connection with an acoustic panel, we may use in lieu of an acoustic sheet a metallic sheet having sealing and rubbing properties.

An advantage of the invention described is that the combination of spotwelding and brazing the parts of the panel together ensures that the parts are effectively secured together without detracting from the acoustic properties of the panel.

Yet a further advantage is that the panel can be readily incorporated in part of a gas turbine engine, particularly in a hot zone thereof, where strength in addition to acoustic properties is required.

A further advantage is that the structure may be incorporated in a part of a gas turbine engine liable to contain liquid, e.g., fuel or water, which might be absorbed by and block the panel or create a potential source of fire, the cutouts in the core providing for effective drainage of the panel.

I claim:

1. An acoustic panel comprising an acoustic first metallic sheet, a second metallic sheet, and a cellular metallic core sandwiched between said sheets, the axes of the cells being normal or inclined to each sheet, in which the ends of the sidewalls of the cells of the core have elements to which said acoustic first metallic sheet is welded, the second sheet is brazed by braze material to the core, said braze material having been caused to flow into corners of the cells of the core so as to reinforce those corners and effectively to secure the second sheet to the core, and means is provided in said corners adjacent to said acoustic sheet to prevent flow of said braze material on to the acoustic sheet.

2. A unit comprising a first metallic sheet, a second metallic sheet and a cellular metallic core between them having the axes of its cells normal or inclined to each sheet, in which the first sheet is welded to attachment elements formed on the core, the attachment elements having spaces between them at corners of the cells of the core, and in which the second sheet is brazed to the core, with the braze material extending into the said corners but not reaching or contacting the first sheet.

3. A unit according to claim 1, in which the core is formed with cutouts formed between the attachment elements at the said corners, whereby in manufacture brazing material flowing at the corners towards the first sheet is prevented from reaching that sheet.

4. A unit as claimed in claim 1, in which the cell walls of the core are formed with corrugations.

5. A unit as claimed in claim 1, which is curved in cross section with mismatching cells in the core, in which a continuous metallic ribbon is located between mismatching cells to prevent leakage between said cells.

* * * * *